May 6, 1958  J. G. FOSTER ET AL  2,833,541
MOTION PICTURE APPARATUS

Filed July 12, 1954  3 Sheets-Sheet 1

INVENTORS
JACKSON G. FOSTER
ARTHUR H. FOSTER
BY
ATTORNEY

May 6, 1958   J. G. FOSTER ET AL   2,833,541
MOTION PICTURE APPARATUS
Filed July 12, 1954   3 Sheets-Sheet 2
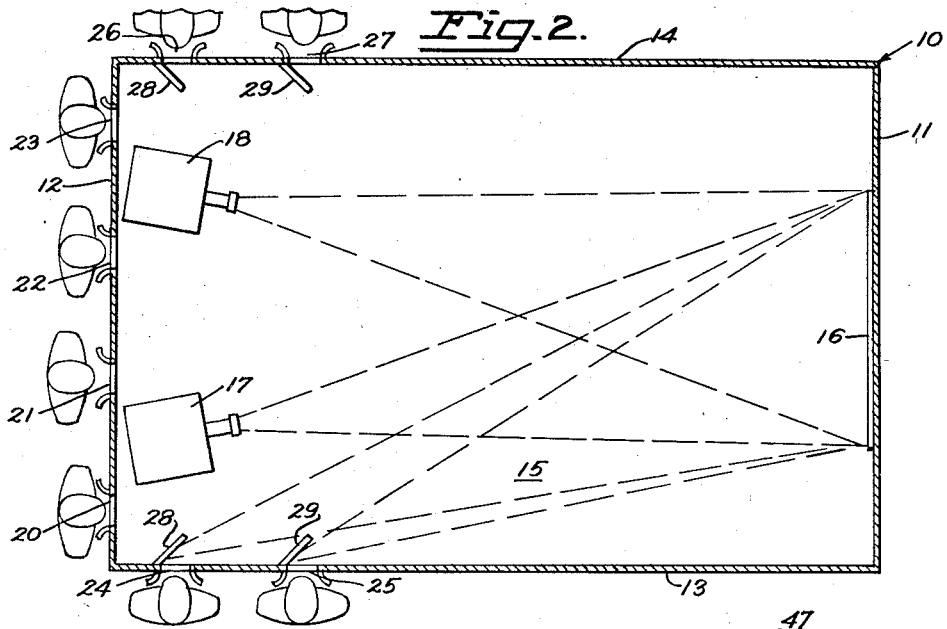
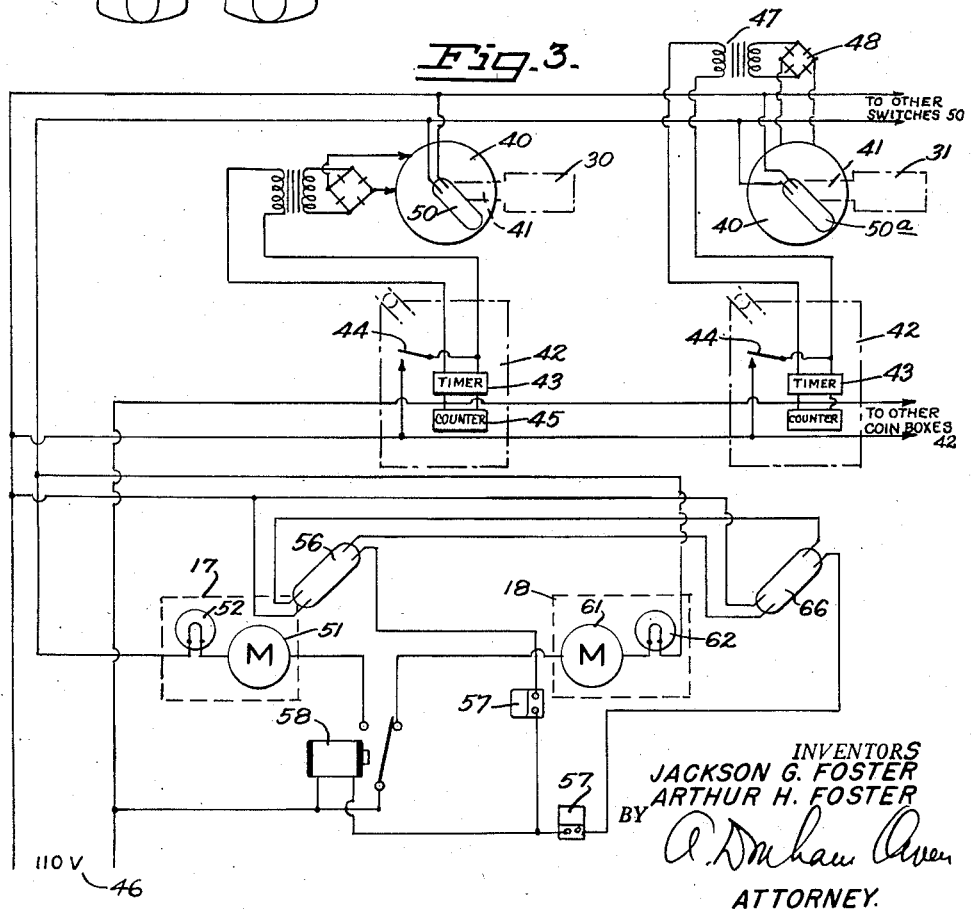
INVENTORS
JACKSON G. FOSTER
ARTHUR H. FOSTER
BY
ATTORNEY.

May 6, 1958 J. G. FOSTER ET AL 2,833,541
MOTION PICTURE APPARATUS
Filed July 12, 1954 3 Sheets-Sheet 3
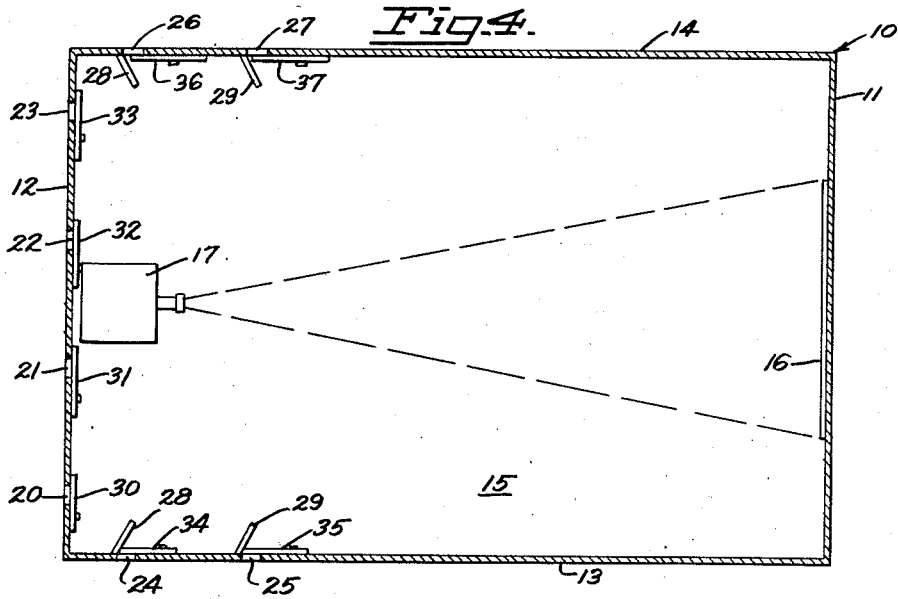
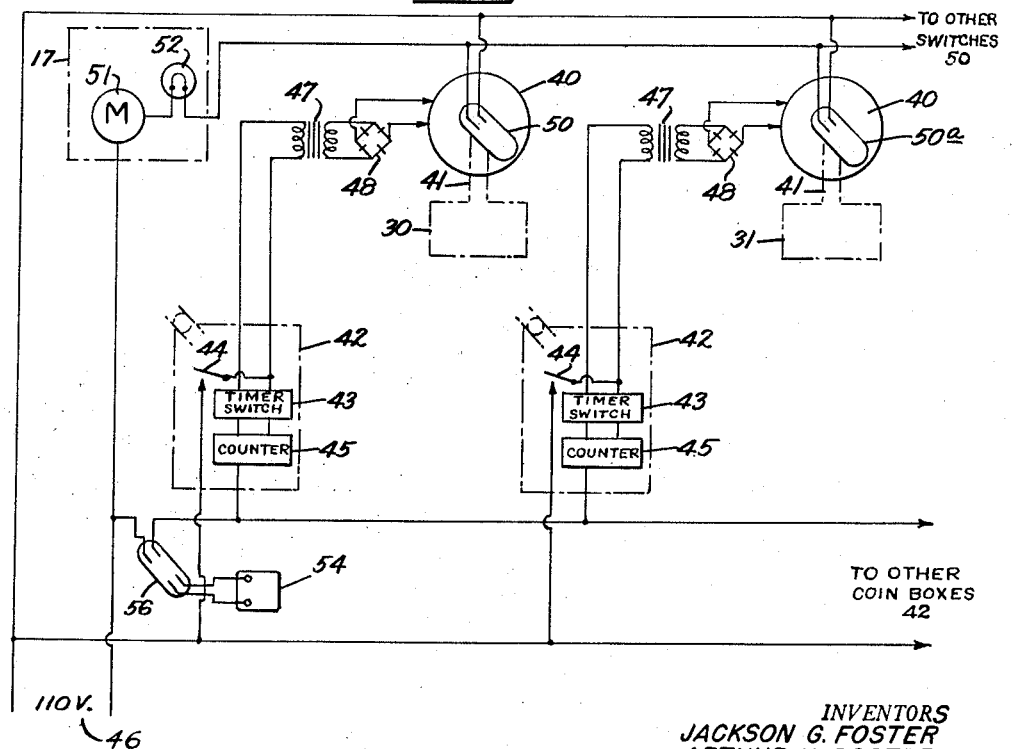
INVENTORS
JACKSON G. FOSTER
ARTHUR H. FOSTER
BY
ATTORNEY United States Patent Office 2,833,541
Patented May 6, 1958

2,833,541

MOTION PICTURE APPARATUS

Jackson G. Foster and Arthur H. Foster, Concord, Calif.

Application July 12, 1954, Serial No. 442,592

9 Claims. (Cl. 272—1)

This invention relates to an improved motion picture apparatus, of the type in which a rectangular booth encloses both the projection apparatus and the screen, and in which each viewer stands outside the booth and watches the picture through a viewing window.

The present invention solves several problems that had heretofore limited the usefulness of this general type of apparatus. One problem was the limitation on the number of viewers. Prior-art booths accommodated only one viewer at a time; the present invention makes it possible to accommodate many people at a single booth, without crowding anyone and without interfering with anyone's enjoyment. It does this by providing several windows in the booth and by utilizing the sides of the booth, providing some viewing windows therethrough which are equipped with mirrors so as to afford a good view of the screen.

In this type of apparatus, the viewing window is normally covered over or obscured by a closure device, which is moved out of the way for a timed interval by a coin-actuated device. At the same time the projector must be started. Therefore, another problem has been to provide separate observers the same amount of viewing time, no matter when one may start observing and, at the same time, to avoid causing interruption of the show during anyone's viewing time. The present invention has solved this problem by a novel circuit arrangement for the viewing window closure devices, which is also connected up with the projector, so that maximum economy is effected in the use of the projector.

Since these apparatus are normally used in nickel arcades and such amusement centers, another problem has heretofore been to avoid taking up too much of the proprietor's time or that of his employees in operating the apparatus. This invention solves this problem by making it possible for an operator to devote a minimum amount of time and attention to the projection apparatus. In this invention, the projector starts automatically when someone begins viewing and stops running when no one is viewing. When the film runs out and has to be changed, an automatic warning system notifies the operator, and, in one form of the invention, an automatic transfer circuit switch starts a second projector when the first one stops, so that there is no interruption of the show.

Other objects and advantages will appear from the following description of some preferred embodiments of the invention presented in accordance with 35 U. S. C. 112.

In the drawings:

Fig. 2 is a top plan diagrammatical view in section of the device of Fig. 1, the projectors being indicated diagrammatically only.

Fig. 3 is a circuit diagram of the device of Fig. 1.

Fig. 4 is a top plan view in section generally like Fig. 2 but showing a modified form of apparatus.

Fig. 5 is a circuit diagram of the apparatus of Fig. 4.

Figure 1:
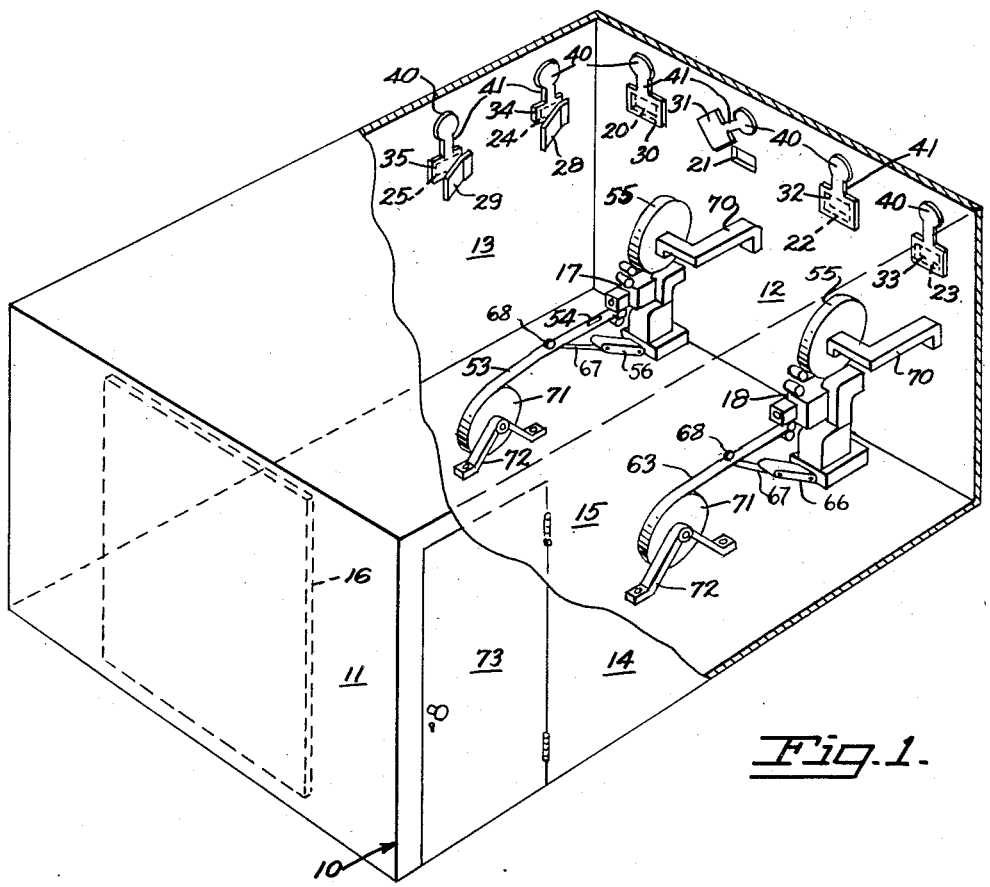
Fig. 1 is a view in perspective of a device embodying the principles of the present invention, some parts being broken away to show other parts more clearly.

The invention, as shown in the drawings, is housed in a box-shaped booth or compartment 10 defined by a rear wall 11, front wall 12, and side walls 13 and 14. Normally, no special ceiling is required, the walls 11, 12, 13, and 14 being extended up to the building's ceiling or being made tall enough so that no one can see over them, and watch the picture without paying, but a special ceiling may be provided to eliminate unwanted scattered light, if desired. The floor 15 may be simply the floor of the building in which the booth 10 is housed. A typical booth like those in the drawings is about twelve feet long by eight feet wide and seven feet high. If fewer viewers are to be accommodated, it may be narrower or shorter, or both; for more viewers it may be wider or longer or both.

A screen 16, upon which the motion pictures are projected, is supported on the inner surface of the rear wall 11. In the form of the device shown in Figs. 4 and 5 the picture emanates from a single projector 17 adjacent the front wall 12. In the form of the device shown in Figs. 1 to 3, two projectors 17 and 18 operate alternately, as described later on.

Instead of having only a single viewing opening, as is normal in this type of device, a plurality of viewing openings 20, 21, 22, and 23 are provided in the front wall 12. In addition, viewing openings 24 and 25 are provided in one side wall 13, and viewing openings 26 and 27 are provided in the other side wall 14. This provision of viewing windows in the side walls 13 and 14 is a feature of the present invention which makes it possible to accommodate more people without crowding them or causing any inconvenience to them. It is made possible by mirrors 28 and 29 set in the side walls 13, 14 adjacent the openings 24, 26, and 25, 27 respectively, and arranged to reflect the picture from the screen 16 through the openings.

In booth 10 like the one shown in the drawings, and with the dimensions already given, where the screen 16 is approximately four feet wide by six feet high, the mirrors 28 and 29 may be approximately six inches wide by five inches high for reflection of the full screen. The mirrors 28 at the windows 24 and 26 may be disposed at an angle of approximately 59° thereto, while the mirrors 29 set at the windows 25 and 27 may be disposed at approximately 62° thereto, for a booth having the dimensions stated previously. This disposition makes it possible for all eight windows of the booth 10 to be used simultaneously.

Although figures have been given, it will be understood that the exact size of the booth 10 as well as the exact number of viewing openings is optional. Preferably, the openings are normally located about two feet apart, measuring between centers, the end opening of any wall being located about one foot from each corner. With these dimensions, there is adequate room for one to look through his viewing opening without interfering in any way with those looking through the next adjacent openings. Space for additional windows in the front wall 12 may be provided by increasing the width of the booth accordingly, and space for additional windows in the side walls 13 and 14 may be obtained by extending the length of the booth accordingly. Of course, more side windows could be added even without doing this, but then the picture would tend to be distorted.

In the present invention, each of the openings 20, 21, 22, 23, 24, 25, 26, 27 is normally closed off by an individual shutter 30, 31, 32, 33, 34, 35, 36, 37, which must be moved out of the way before the viewer can see the screen 16. Each shutter 30, 31, 32, 33, 34, 35, 36, 37 is operated by a solenoid 40. The solenoid 40 may be of the ordinary type, with a lever connection or direct connection to the shutter, but superior results can be obtained by using a circular or rotary solenoid 40 as shown, that, when energized, rotates a shutter arm 41 to displace the shutter about 66° and remove it from in front of its opening. De-energization of the solenoid 40 causes the shutter to go back in front of the viewing opening. Energization of the solenoid 40 is controlled by an actuator, such as a coin box 42, which may be provided with a timer 43 that automatically de-energizes the solenoid 40 after a predetermined interval of time.

In this invention, the projectors 17 or 18 operate only while one or more of the windows 20, 21, 22, 23, 24, 25, 26, or 27 is open, i. e., uncovered by its shutter. In other words, the coin that opens the first window will start operation of the projector 17 or 18 as well as causing the shutter to move and open the window, and the projector 17 or 18 will continue to operate so long as someone continues to supply the apparatus with coins at any window, even after the original viewer's time is up and his shutter has closed.

The means by which this result is achieved will now be explained, with reference to the circuit diagrams, the first form of the device to be considered being the simple one shown in Figs. 4 and 5, where there is only one projector 17. In addition to the timer 43, each coin apparatus 42 includes a coin-actuated switch 44, and preferably a counter 45 to keep track of how many people have used that particular box 42, thereby providing a check on the number of the coins which should be in the coin box 42. When the switch 44 is closed (by dropping a coin), current can flow from a current source 46 to a transformer 47 and from there, preferably through a rectifier 48, to the solenoid 40 for that particular shutter, say the shutter 30. When this happens, the element of the solenoid 40 is rotated 66° and the shutter 30 is rotated out of the way, affording an unimpeded view through the opening 20, so that the screen 16 can be clearly seen.

In addition to opening the shutter 30, rotation of the solenoid 40 also rotates a mercury switch 50 mounted thereon, turning it from its open to its closed position. Closing the mercury switch 50 turns on the motor 51 and lamp 52 of the projector 17 and a picture is then thrown on the screen 16.

At the end of a predetermined interval of time, the timer 43 will shut off the current to the transformer 47 and therefore, no current will flow through the rectifier 48, the solenoid 40 will be de-energized, and the shutter 30 will fall back into place. Simultaneously, the mercury switch 50 will be rotated to its open position, and unless some other switch 50 has been closed in the meantime, the motor 51 and lamp 52 of the projector 17 will be shut off.

However, all the coin boxes 42 are provided with identical parallel circuits and any mercury switch 50, when closed, will operate the projector 17 and cause it to continue operating. If a second viewer begins viewing while the first viewer's time is still running, his coin will not only move his shutter 31 out of his way, but will operate the remainder of the circuit in connection therewith. Therefore, the circuit to the second mercury switch 50a will remain closed after the first viewer's shutter 30 has shut off his view. The projector 17 will continue running until all the timers 43 have opened all their circuits and until the last mercury switch 50 is opened. Then, when the last shutter closes, the projector 17 will be shut off. It will be noted that this saves the time of the proprietor or his employees, conserves the power of the projector motor 51, and conserves the lamp 52 during the time when the apparatus is not in use.

The above described apparatus keeps the machine operating until the end of the film 53 approaches. There (see Fig. 1) a notch 54 may be provided, or if desired, the film 53 can be permitted to run entirely off its reel 55. When the notch 54 is reached (or the end of the film is passed by) the mercury switch 56 falls (Figs. 1, 3, and 5), thereby opening the electric circuit of the projector 17. Simultaneously, it may turn on a buzzer 57 which warns the proprietor that automatic operation is at an end and that the film needs to be changed, reversed, or rewound.

To summarize briefly the operation of the device of Figs. 4 and 5, suppose that the projector 17 is not operating and that someone wants to see the show. When he deposits a coin in a box 42, the switch 44 is closed, one shutter 30 is raised, opening the window 20 and the projector 17 starts projecting a picture on the screen 16. If no one else drops a coin in any other coin box, the projector 17 will stop when the timer 43 de-energizes the solenoid 40 and the shutter 30 closes. However, if in the meantime someone else has deposited a coin while the projector 17 is still operating, the projector 17 will not stop when the first shutter 30 closes but will continue running until the second shutter 31 closes or, if in the meantime a third coin has been deposited in another box, until all the shutters are closed. Finally, the automatic operation continues until the film 53 runs out, and then a warning signal is sounded by the buzzer 57.

The two-projector apparatus of Figs. 1–3 makes it possible to avoid interruption while the film is being changed or rewound. The operation is identical at all other stages with the operation of Figs. 4 and 5. However, when the notch 54 is reached, instead of the switch 56 merely cutting off the motor 51 and lamp 52 of the projector 17 and starting the buzzer 57, the apparatus of Figs. 1–3 also actuates a transfer relay or latching relay 58 or other means that starts the motor 61 and lamp 62 of the second projector 18 operating. This means that the show can continue without interruption, the film at one projector being changed while the other projector is running. When the end (or notch 54) of the second film 63 is reached, the projector 18 will be shut off by the switch 66, and the first projector 17 will be started again.

As shown in Fig. 1, the projectors 17, 18 may be relatively simple devices, with one reel 55 of each mounted on a bracket 70 secured to the front wall 12 and the other reel 71 mounted on a bracket 72 that is held in the floor 15. A door 73 may be provided in one wall of the booth 10, for access by the proprietor or other operator to the inside of the booth 10.

For convenience and superior operation, the mercury switches 56, 66 may be mounted in an arm 67 that is pivoted or hinged to the projector 17 or 18. The outboard end of the arm 67 holds a freely-rotatable roller 68 that rides on the film 53 or 63 at all times, its weight serving to keep it in contact. When the notch 54 or end (not shown) of the film is reached, the roller 68 is no longer supported; so the arm 67 falls, actuating the mercury switch 56 or 66.

As one skilled in the art will see, if the film 53 or 63 in any form of this device becomes broken, the mercury switch 56 or 66 will fall as the break passes it, just as it falls at the end (not shown) of the film 53 or 63 or at the notch 54. When the switch 56 or 66 falls, it sounds the warning buzzer 54 or 57, notifying the proprietor of the need for him to come and give his attention to the device. Thus, the switches 56, 66 and buzzers 54, 57 provide a safety and warning device, as well as an indicator of the end of the film in normal operation. It will be remembered that the switch 56 or 66, as it falls, also cuts off the projector motor 51 and lamp 52, so that no further damage to the films 53 will occur. In the device of Figs. 1–3, there is, in this event of breakage, an added advantage, because the falling of the mercury switch 56 or 66 will start the other projector running, the observer will still have a show to watch, and the proprietor can repair the break before the next changeover takes place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a motion picture apparatus having a rectangular booth enclosed by front, rear, and side walls, a screen inside said booth adjacent said rear wall, projection means in said booth for projecting a picture on said screen, a plurality of windows for viewing the picture on said screen, and shutter means normally closing off the view through each said window, the combination therewith of shutter-opening means for moving each said shutter means out of the way for a predetermined interval of time only and independently of the opening or closing of the remaining shutter means, and automatic means actuated by said shutter-opening means for operating said projection means when any shutter means is open, and so long as any shutter means is open and film is on said projection means and for stopping said projection means when all said shutters are closed.

2. In a motion picture apparatus having a rectangular booth enclosed by front, rear, and side walls, a screen inside said booth adjacent said rear wall, projection means in said booth for projecting a picture on said screen, a plurality of windows for viewing the picture on said screen, and a shutter normally closing off the view through each said window, the combination therewith of an electric circuit means for moving each said shutter means out of the way for a predetermined interval of time, independently of the remaining shutters, said electric circuit means comprising an initial actuating switch, a timer and a solenoid, in series, for each said shutter, said solenoid serving to open said shutter when energized by the closing of said switch and holding it open while held energized by said timer, and a mercury switch rotated from open position to closed position by energization of each solenoid and vice versa upon deenergization thereof, all said mercury switches being in parallel with each other and in series with said projection means, whereby said projection means operates when any shutter is open and so long as any shutter is open and film is on said projection means and whereby said projection means stops when all said shutters are closed.

3. In a motion picture apparatus having a rectangular booth with front, rear, and side walls, a screen inside said booth adjacent said rear wall, a projector for projecting a picture on said screen, a plurality of viewing windows in said booth, and a pivotally mounted shutter for each window, adapted normally to close off the view through said window, the combination therewith of means for opening each said shutter independently of the remaining shutters for a predetermined interval of time to permit viewing of the picture on said screen through its window, and automatic projector operating means actuated by the opening of any said shutter for running said projector when and only when any said shutter is open.

4. In a motion picture apparatus having a rectangular booth with front, rear, and side walls, a screen inside said booth adjacent said rear wall a projector for projecting a picture on said screen, a plurality of viewing windows in said booth, and a pivotally mounted shutter for each window, adapted normally to close off the view through said window, the combination therewith of means for opening each said shutter independently of the remaining shutters for a predetermined interval of time to permit viewing of the picture on said screen through its window, said means comprising an electric circuit for each said shutter with a coin-operated switch, a timer, and a circular solenoid in series with each other, said solenoid being energized by a coin inserted in said switch and held energized by said timer for a time interval and when energized holding its shutter open, and automatic projector operating means actuated by the opening of any said shutter for running said projector when and only when any said shutter is open, said automatic projector operating means comprising a mercury switch rotated by said solenoid from open position when said shutter is closed to closed position when said shutter is open, all said mercury switches being in parallel with each other and in series with said projector.

5. In a motion picture apparatus having a rectangular booth with front, rear, and side walls, a screen inside said booth adjacent said rear wall, two projectors for projecting a picture on said screen, one at a time, a plurality of viewing windows in said booth, and a pivotally mounted shutter for each window, adapted normally to close off the view through said window, the combination therewith of means for opening each said shutter independently of the remaining shutters for a predetermined interval of time to permit viewing of the picture on said screen through its window, automatic projector operating means actuated by the opening of any said shutter for running said one said projector when and only when any said shutter is open; and automatic projector switchover means for turning one said projector off and the other projector on when said one projector reaches an end of its film.

6. In a motion picture apparatus having a rectangular booth with front, rear, and side walls, a screen inside said booth adjacent said rear wall, projection means for projecting a picture on said screen, a plurality of windows in said booth for viewing the picture on said screen, and a corresponding plurality of shutters normally closing off the view through each said window, the combination therewith of an electric circuit with a rotatable circular solenoid for each said shutter and serving when energized to move its said shutter out of the way and hold it out of the way so long as it is energized, independently of the remaining shutters, a coin-operated switch for each said solenoid, whereby said solenoid is energized by insertion of a coin in said switch, a timer for holding each said solenoid energized for a predetermined interval of time after insertion of a coin in its said switch, and a plurality of mercury switches, each rotated by one said solenoid from open to closed position by energization of said solenoid, said mercury switches being in parallel with each other and in series with said projection means so that upon closing of any of said mercury switches, said projection means operates and continues to operate so long as any mercury switch is closed and film is on said projection means, said projection means stopping when all said mercury switches are open.

7. In a motion picture apparatus having a rectangular booth with front, rear, and side walls, a screen inside said booth adjacent said rear wall, projection means for projecting a picture on said screen, a plurality of windows in said booth for viewing the picture on said screen, and a corresponding plurality of shutters normally closing off the view through each said window, the combination therewith of an electric circuit with a rotatable circular solenoid for each said shutter and serving when energized to move its said shutter out of the way and hold it out of the way so long as it is energized, independently of the remaining shutters; a coin-operated switch for each said solenoid, whereby said solenoid is energized by insertion of a coin in said switch; a timer for holding each said solenoid energized for a predetermined interval of time after insertion of a coin in its said switch; a plurality of mercury switches, each rotated by one of said solenoid from open to closed position by energization of said solenoid, said mercury switches being in parallel with each other and in series with said projection means so that upon closing of any said mercury switch, said projection means operates and continues to operate so long as any mercury switch is closed and film is on said projection means, said projection means stopping when all said mercury switches are open; and another mercury switch means in series with said projection means held open mechanically by film passing through said projection means and closing when no film holds it open, so that said projection means then stops.

8. The apparatus of claim 7 wherein there is also a buzzer actuated by the opening of said last-named mercury switch means for giving audible warning of the fact that said projection means has stopped.

9. The apparatus of claim 7 in which said projection means comprises a pair of projectors each provided with a last-named mercury switch, one projector only being operated at any one time, and a changeover switch energized upon the opening of said last-named mercury switch at one projector to start the second projector operating.

References Cited in the file of this patent
UNITED STATES PATENTS

| | | |
|---|---|---|
| 1,115,017 | Pierce | Oct. 27, 1914 |
| 1,434,845 | Richardson et al. | Nov. 7, 1922 |
| 1,583,143 | Hansen | May 4, 1926 |